D. SWAROVSKI & H. WEIS.
APPARATUS FOR SUPPLYING MEASURED QUANTITIES.
APPLICATION FILED JUNE 28, 1913.

1,106,686.

Patented Aug. 11, 1914.

UNITED STATES PATENT OFFICE.

DANIEL SWAROVSKI AND HUGO WEIS, OF WATTENS, NEAR HALL, AUSTRIA-HUNGARY, ASSIGNORS TO THE FIRM OF GLASSCHLEIFEREI WATTENS A. KOSMANN, D. SWAROVSKI & CO., OF WATTENS, TYROL, AUSTRIA-HUNGARY.

APPARATUS FOR SUPPLYING MEASURED QUANTITIES.

1,106,686.   Specification of Letters Patent.   Patented Aug. 11, 1914.

Application filed June 28, 1913.   Serial No. 776,455.

*To all whom it may concern:*

Be it known that we, DANIEL SWAROVSKI and HUGO WEIS, citizens of Austria, both residing at Wattens, near Hall, Tyrol, Austria-Hungary, have invented certain new and useful Improvements in Apparatus for Supplying Measured Quantities, of which the following is a specification.

Our invention relates generally to improvements in apparatus for supplying measured quantities of a commodity, and has more particular reference to an apparatus by means of which quantities of such articles as imitation precious stones, beads and the like may be measured and delivered to any desired receptacle.

The principal object of our invention is to provide a simply constructed device for the purpose stated, wherein danger of crushing or otherwise injuring the commodity being measured and supplied is eliminated, and damage to the machine itself is prevented.

The invention comprises the several novel features and combinations of parts hereinafter particularly claimed, and fully described in the following specification, reference being had to the accompanying drawing, wherein—

Figure 1:
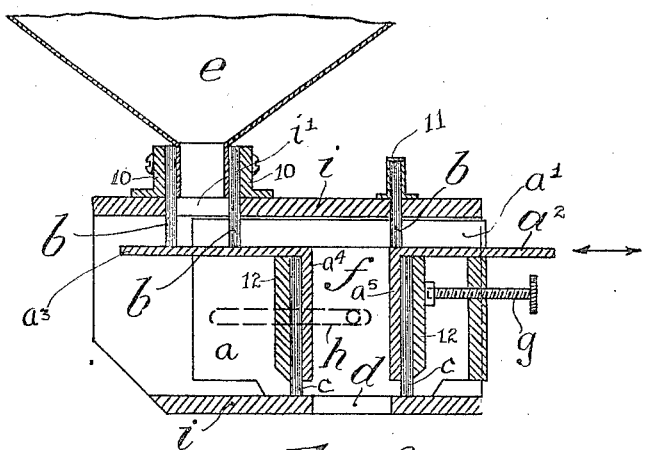
Figure 2:
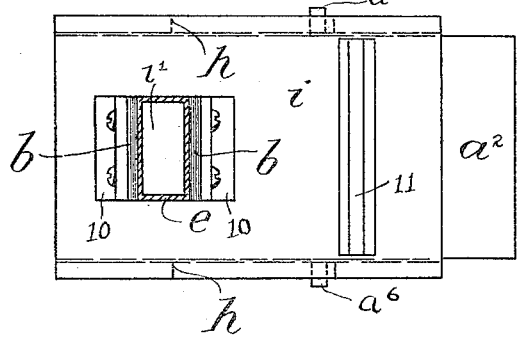

Figure 1 is a substantially central, vertical section of an apparatus embodying our invention; and Fig. 2 is a top plan view thereof.

Referring to the drawing by characters of reference, $i$ designates a casing preferably rectangular in shape, having an inlet opening $i'$ in its upper wall, and a discharge opening $d$ in its base, these openings being out of alinement as shown. Secured over the inlet opening $i'$, by means of brackets 10 held on the outer face of the upper casing wall, is a funnel shaped hopper $e$, through which the commodity to be measured and supplied is fed. Slidable within the casing $i$ is a carriage designated generally as $a$, and the function of which is to receive desired quantities of the commodity from the hopper $e$ and convey the same to the discharge opening $d$, through which they pass into any receptacle provided for the purpose.

The carriage $a$ includes the lateral walls $a'$ (only one of which is visible in Fig. 1), the two horizontal walls $a^2$ and $a^3$, and the vertically depending walls $a^4$ and $a^5$, the latter forming between them a chamber $f$, the capacity of which may be varied, as will be more fully hereinafter described. The upper surfaces of the walls $a^2$ and $a^3$ are spaced away from the lower surface of the upper wall of the casing $i$, and the lower edges of the walls $a^4$ and $a^5$ are spaced away from the upper surface of the lower wall of the casing $i$, while the lateral walls $a'$ extend substantially from the top to the bottom of the casing $i$.

Projecting outwardly from each lateral wall $a'$ is a pin $a^6$, which extends through a longitudinal slot $h$ formed in each of the side walls of the casing $i$. The carriage may be either manually or automatically reciprocated through the medium of the pins $a^6$, the slots $h$ limiting the extent of travel of the carriage in either direction.

Secured to the upper wall of the casing $i$ are a plurality of flexible scrapers $b$, which depend within the casing and have their lower edges contacting with the upper surfaces of the horizontal walls $a^2$ and $a^3$. These scrapers are preferably formed as brushes, two thereof being secured adjacent the inlet opening $i'$ by the brackets 10, and a third scraper being held by a bracket 11 near the opposite end of the machine. The depending vertical walls $a^4$ and $a^5$ also carry scrapers $c$, which like the scrapers $b$ are preferably formed as brushes, the lower edges of the scrapers $c$ contacting with the upper surface of the base of the casing $i$. The scrapers $c$ are held to the walls $a^4$ and $a^5$, respectively, by the blocks 12 engaging the scrapers on the sides opposite those lying against the walls $a^4$ and $a^5$. The scrapers assist in guiding the carriage in its reciprocatory movement within the casing $i$, and owing to their flexibility prevent crushing of any articles lying in their path either on the walls $a^4$ and $a^5$ or on the bottom of the casing $i$. Should the scrapers encounter any article being conveyed within the apparatus, they will either yield sufficiently to allow the article to pass, or will brush it aside without injury thereto, or will take up and hold the article until it is removed.

The wall sections $a^2$ and $a^5$ are movable as a unit lengthwise in the lateral walls $a'$ by means of the screw bolt $g$, and by movement of these wall sections, the capacity of the chamber $f$ may be adjusted as desired.

The operation of the invention is simple, and will be understood from the following description thereof:—The capacity of the chamber $f$ is first adjusted so that this chamber will contain the desired number or quantity of articles required for each charge. The articles are then fed into the hopper $c$, continuously or intermittently as preferred, and the carriage is reciprocated. When the chamber $f$ is in line with the admission opening $i'$ the articles will pass into the chamber $f$, the excess articles being confined between the pair of brushes $b$ at the left of the device. When the carriage has moved sufficiently far to the right, the chamber $f$ will be alined with the outlet $d$ and the contents of the chamber discharged therethrough. In the movement of the carriage to the left or right, the flexible brushes $b$ and $c$ act, as above described, to prevent crushing or injury to the articles and consequent stoppage of operation of the device. It will also be noted that the upper pair of brushes $b$, and the lower pair of brushes $c$, form discharge chutes; the first mentioned pair guiding the articles in their passage into chamber $f$, and the other pair guiding the articles during their discharge out of the chamber $f$.

What we claim as new and desire to secure by Letters Patent is:—

1. A device of the character specified, embodying therein a casing having an admission opening and a discharge opening, a carriage operable within said casing for conveying commodities from said admission opening to said discharge opening, said carriage being provided with vertical walls the lower edges of which are spaced away from the base of the casing, a flexible chute for guiding said commodites from said admission opening to said carriage, and a flexible chute extending from the lower edges of said vertical walls into contact with the base of the casing for guiding said commodities from said carriage to said discharge opening.

2. A device of the character specified, embodying therein a casing having an admission opening in its upper wall and a discharge opening in its lower wall out of alinement with said admission opening, a carriage reciprocable within said casing and having a chamber therein of variable capacity open at both ends, a pair of brushes extending from said admission opening into contact with the upper wall of said carriage and adapted to guide commodities into the upper end of the chamber in the carriage, and a pair of brushes depending from the lower portion of said carriage and adapted to guide commodities out of said chamber to said discharge opening.

In testimony whereof we affix our signatures in presence of two witnesses.

DANIEL SWAROVSKI.
HUGO WEIS.

Witnesses:
RICHARD LEMP,
JOHANNA STERN.

---

Copies of this patent may be obtained for five cents each, by addressing the "Commissioner of Patents, Washington, D. C."